Oct. 5, 1926.
E. T. HAZELTON
DIRIGIBLE HEADLIGHT
Filed August 20, 1924
1,601,828
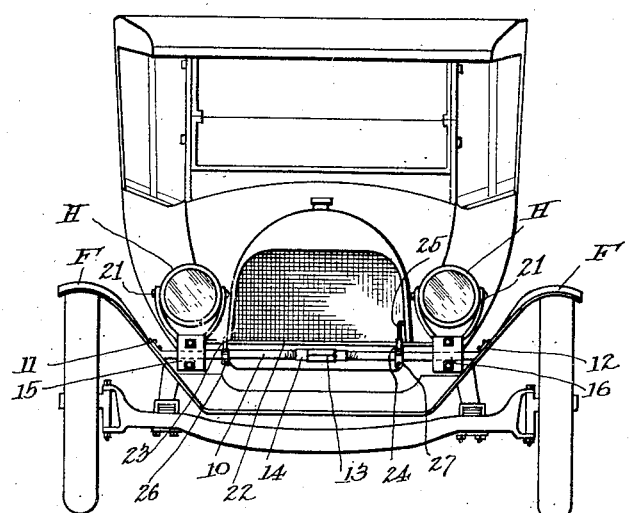
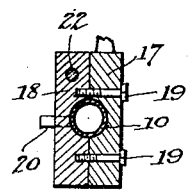
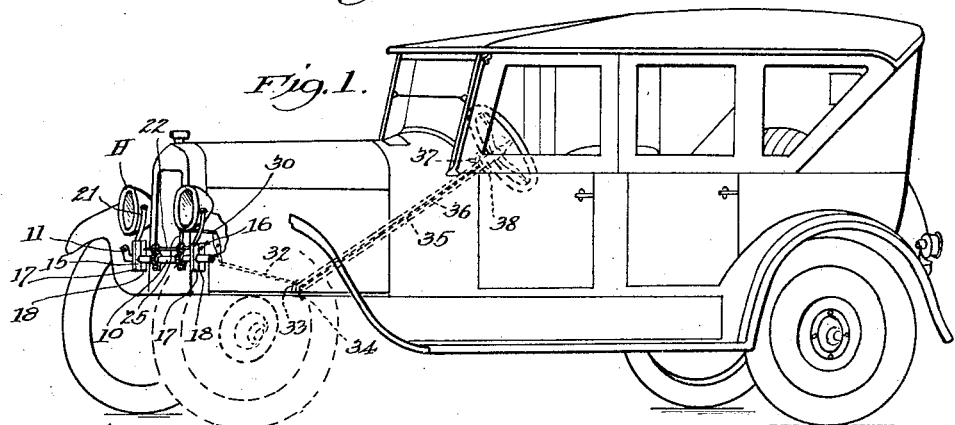
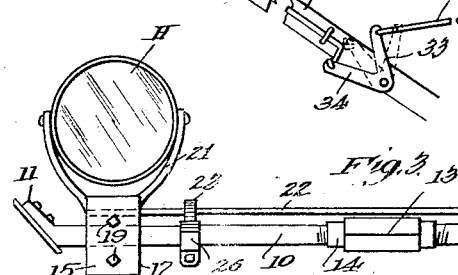
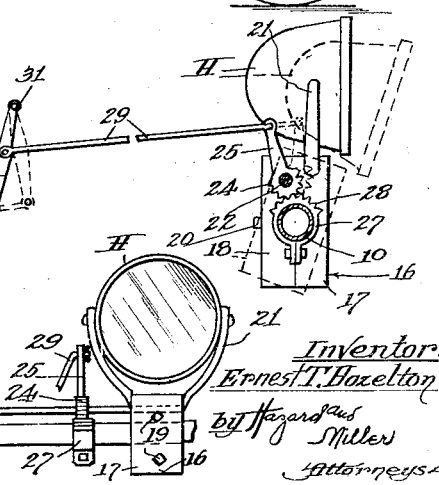
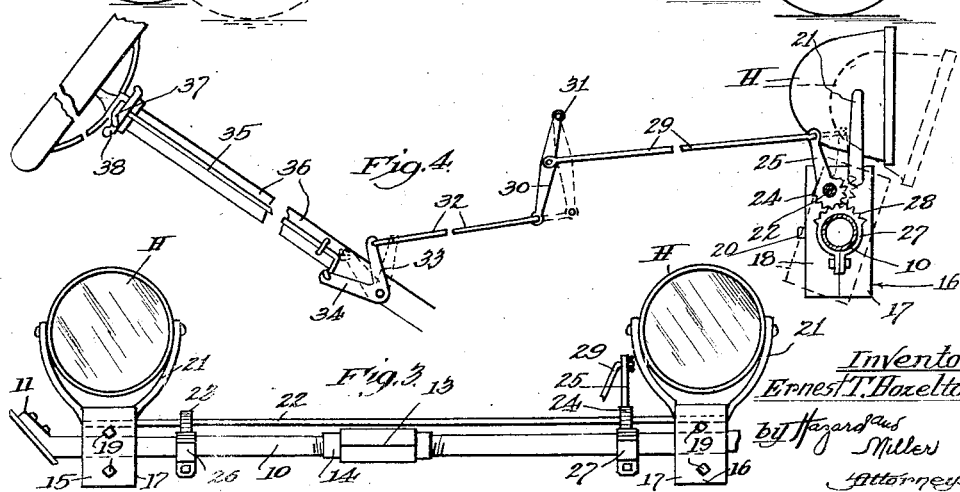

Patented Oct. 5, 1926.

1,601,828

UNITED STATES PATENT OFFICE.

ERNEST T. HAZELTON, OF BAKERSFIELD, CALIFORNIA.

DIRIGIBLE HEADLIGHT.

Application filed August 20, 1924. Serial No. 733,134.

This invention relates to improvements in headlights for automobiles.

It has been found by experience that an automobile which has its headlights carefully adjusted so as to direct the light downwardly upon the road within a certain predetermined distance will often have its lights thrown out of adjustment by placing a large load in the automobile and especially in the back seat thereof. Although the difference in the actual inclination of the headlights is often very small, it frequently becomes sufficient to cause the light to be directed upwardly a sufficient amount to break the headlight laws in many States.

It is therefore an object of this invention to provide a means operable from the driver's compartment of an automobile for easily, quickly and accurately adjusting the headlights.

With the foregoing and other objects in view which will be made manifest in the following detailed description and pointed out in the appended claims, reference is had to the accompanying drawings for an illustrative embodiment of the invention, wherein:

Figure 1 is a perspective view of an automobile to which the improved device has been applied, Fig. 2 is a front elevation of the same, Fig. 3 is a front elevation showing parts illustrated in Fig. 2 upon an enlarged scale, Fig. 4 is a side elevation of the mechanism causing the tilting of the headlights, and Fig. 5 is a vertical section through a block upon which one of the headlights is mounted.

Referring to the accompanying drawings wherein similar reference characters designate similar parts throughout, a bar 10, which is preferably circular in form and which may constitute a section of pipe, has its ends 11 and 12 flattened and secured upon the inner faces of the front fenders F of an automobile by means of rivets or their equivalent. As a means for providing adjustment for the bar 10 upon a mounting, a suitable turn-buckle 13 is provided, preferably centrally thereof, and which has a locking nut 14.

Adjacent the ends 11 and 12 of the bar 10 are rotatably mounted a pair of blocks 15 and 16. Each of these blocks, as shown in Fig. 5, is composed of two pieces 17 and 18 adapted to be held together by means of tap screws 19, or their equivalent. Any suitable means may be provided for lubricating the blocks 15 and 16 so that they may be easily turned upon the bar 10. In the present form of the invention I have shown suitable oil or grease cups 20 extending through the pieces 18.

The headlights H are secured to the pieces 17 by means of brackets 21. A rod 22 has its ends journaled in the rearmost pieces 18 of the blocks 15 and 16. This rod is provided with a pinion 23 and with a second pinion 24, which second pinion has formed integral therewith a lever 25. A pair of collars 26 and 27 are fixedly secured upon the bar 10 and are provided with a series of teeth 28 adapted to mesh with the teeth of the pinions 23 and 24. The lever 25 has its end pivotally secured to a link 29 which in turn is pivotally secured intermediate the ends of a lever 30 which may have its upper end 31 pivoted to a suitable support beneath the hood upon the motor of the automobile, and which lever has its opposite end connected to a link 32. The link 32 is connected to the arm 33 of a bell crank, which has its other arm 34 connected to a rod 35 secured upon the steering post 36 of the vehicle and which has a handle 37 slidable upon a suitable quadrant 38.

The operation of the device is as follows: Upon swinging the handle 37 upwardly upon the quadrant 38 the rod 35 will be rotated causing swinging movement of the bell crank and imparting forward movement to the links 32 and 29. This causes rotation of the rod 22 upon which the pinions 23 and 24 are rigidly secured. As the rod 22 rotates, the teeth of the pinions 23 and 24 engage the teeth upon the fixed collars 26 and 27, causing the rod 22 to be moved forwardly about the bar 10 as a center. Because of the fact that the rod 22 has its ends journaled in the pieces 18 of the blocks 15 and 16, these blocks will be caused to turn upon the bar 10, producing the tilting of the headlights. As indicated in Fig. 4, it will be understood that upon swinging the handle 37 downwardly, the headlights H may be returned to their vertical position. The lever 30 is preferably employed so that the movement of the handle 37 will be reduced, that is, a large movement of the handle 37 will create a small movement of the headlights H, thereby providing a very accurate adjustment.

It is to be understood that various changes may be made in the detail of construction without departing from the spirit or scope of the invention as defined by the appended claims.

I claim:

1. A tiltable headlight for automobiles comprising a bar adapted to be secured to the fenders of an automobile, blocks carrying headlights rotatably mounted upon said bar, a rod having its ends journaled in said blocks, pinions carried by said rod, collars having teeth formed thereon engageable by said pinions, said collars being fixedly secured upon said bar, and means adapted to be manually actuated from the driver's compartment of the automobile causing rotation of said pinions thereby producing tilting movement of said headlights.

2. A tiltable headlight construction for vehicles comprising a support, a headlight tiltably mounted upon said support, and means rotatably connected to said headlight and engaging said support, said means being adapted to roll upon said support and produce tilting of the headlight.

3. A tiltable headlight construction for vehicles comprising a support, a headlight tiltably mounted upon said support, means rotatably connected to said headlight and engaging said support, said means being adapted to roll upon said support and produce tilting of the headlight, and means for operating said means from the driver's seat of the vehicle.

4. A tiltable headlight construction for vehicles comprising a transverse bar, headlights rotatably mounted upon said bar, a rod rotatably connected to said headlights and extending therebetween, means connected to said rod engaging and rollable upon said bar, and means for rotating said rod so as to tilt the headlights.

5. A tiltable headlight construction for vehicles comprising a support, headlights tiltably mounted upon said support, means providing teeth rotatably connected to said headlights, means providing teeth upon said support meshing with the mentioned teeth, and means for rotating the first mentioned means so as to tilt the headlights.

6. A tiltable headlight construction comprising a support, headlights tiltably mounted upon said support, means providing teeth rotatably connected to said headlights, there being teeth provided upon said support engageable by the mentioned teeth, and means operable from the driver's seat on the vehicle for rotating the first mentioned means so as to tilt the headlights.

In testimony whereof I have signed my name to this specification.

ERNEST T. HAZELTON.